Aug. 15, 1961    R. DAUB    2,996,341
PISTON HEAD STRUCTURE
Filed April 6, 1956    2 Sheets-Sheet 2
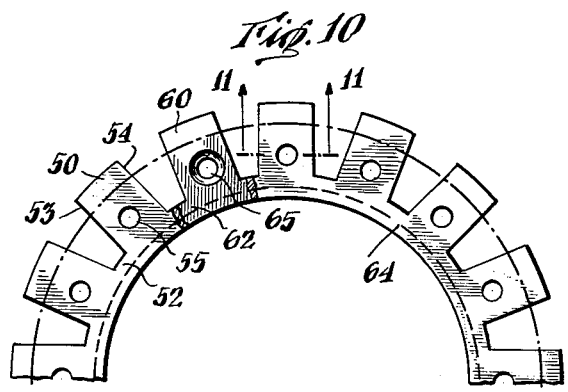
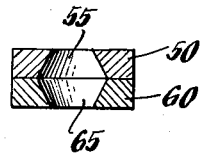
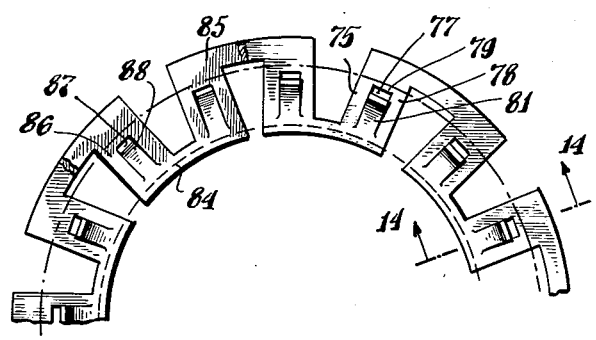
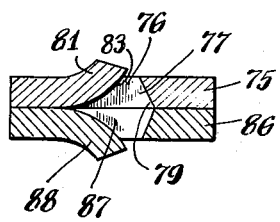
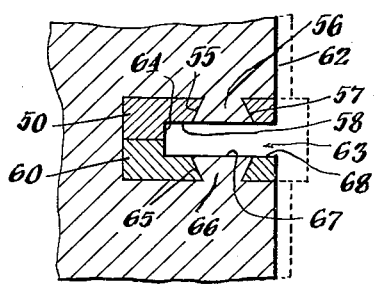
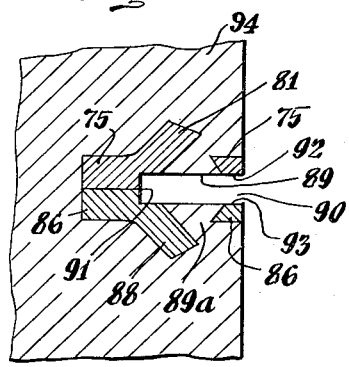
INVENTOR
Rudolph Daub
BY
Frank G. Bower
ATTORNEY

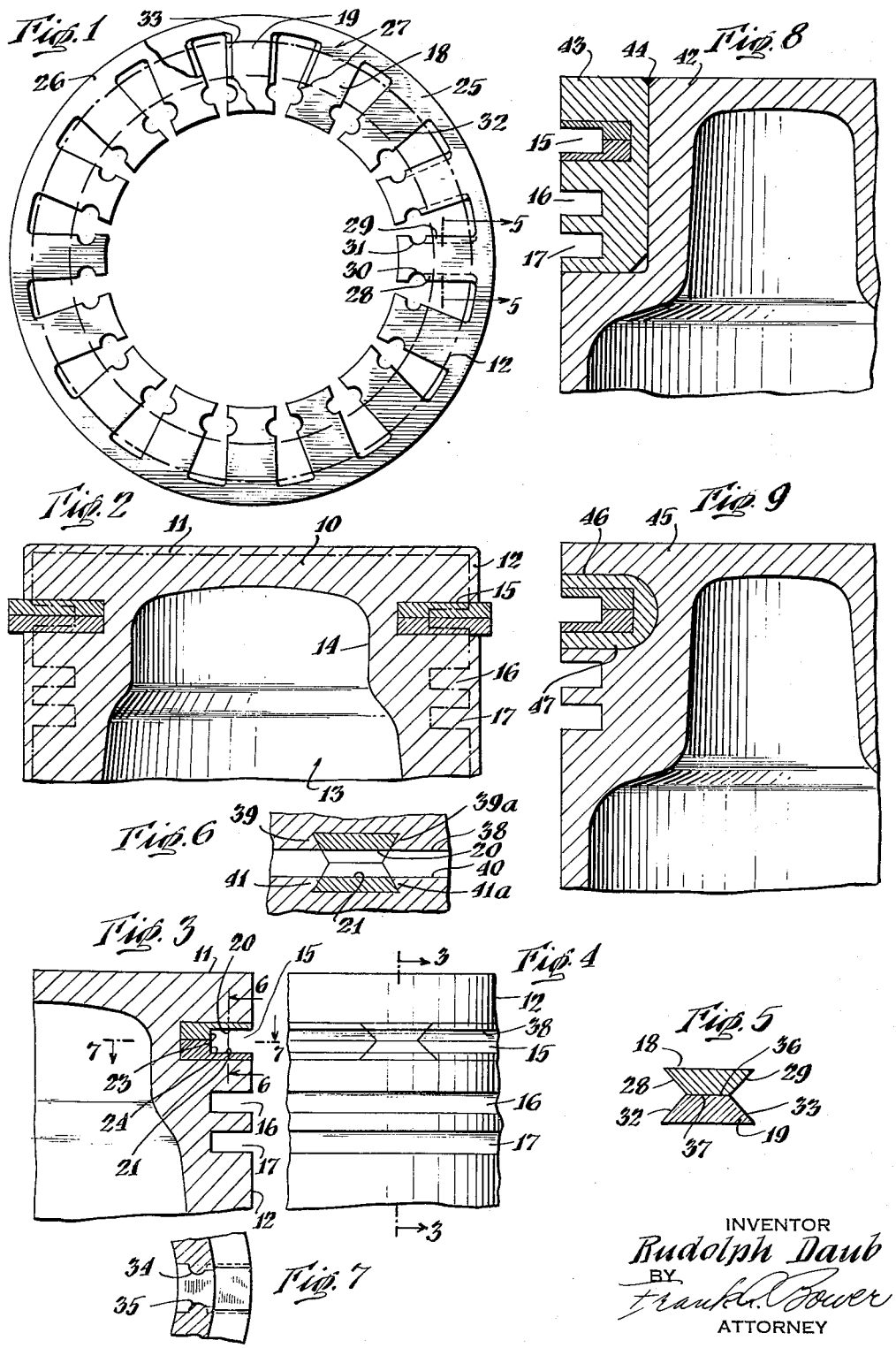

United States Patent Office 2,996,341
Patented Aug. 15, 1961

2,996,341
PISTON HEAD STRUCTURE
Rudolph Daub, West Caldwell, N.J.
(9 Hickory Drive, North Caldwell, N.J.)
Filed Apr. 6, 1956, Ser. No. 576,654
27 Claims. (Cl. 309—14)

This invention relates to pistons for internal combustion engines, and is directed particularly to the piston head and piston ring groove.

An object of the invention is to provide an internal combustion engine piston that rapidly conducts the heat of combustion from the top surface of the piston and has piston ring grooves that retain shape and size during long periods of operation.

Another object of the invention is to provide in the walls of the piston ring grooves of an aluminum piston, flat, hard, wear surfaces normal to the axis of the piston and anchored in the piston.

Another object of the invention is to provide a high heat conductive piston with wear-resistant piston ring grooves that is inexpensive to manufacture and durable in sustained use.

Other and further objects of the invention will be apparent from the following description taken in connection with the drawings in which:

FIG. 1 is a plan view of the insert before molding and machining of the piston;

FIG. 2 is a cross sectional view of the piston after molding and prior to machining;

FIG. 3 is a fragmentary sectional view of machined piston taken along lines 3—3 of FIG. 4;

FIG. 4 is a side view of a machined piston;

FIG. 5 is a fragmentary sectional view of the wear plates taken along lines 5—5 of FIG. 1;

FIG. 6 is a sectional view of the piston insert taken along lines 6—6 of FIG. 3;

FIG. 7 is another sectional view of the insert taken along lines 7—7 of FIG. 3;

FIG. 8 is a fragmentary sectional view of a forged piston with a cast machined ring with wear plates;

FIG. 9 is a fragmentary sectional view of another form of the embodiment of FIG. 8;

FIG. 10 is a fragmentary plan view of another embodiment with a tapered opening;

FIG. 11 is a sectional view of the tapered opening taken along lines 11—11 of FIG. 10;

FIG. 12 is a sectional view of the embodiment in FIG. 10 embedded in a piston;

FIG. 13 is another embodiment of the plates prior to molding and machining;

FIG. 14 is a sectional view of the anchor means taken along lines 14—14 of FIG. 13; and FIG. 15 is a sectional view of the embodiment shown in FIG. 13 embedded in the piston.

Referring to the embodiment shown in FIGS. 1-3, a cast piston 10, preferably of aluminum alloy metal, is shown with a top surface 11, cylindrical side surface 12 (indicated by dot and dash lines in FIG. 2) and an inner chamber 13 with a wall 14. In the side 12 is the top piston ring groove 15 and piston ring grooves 16, 17. In the piston 10 are metal plates 18, 19 forming radial hard wear resistant surfaces 20, 21 and axial surfaces 23, 24.

The plates 18, 19 are stamped from sheet iron and held in circumferential spaced relation as unitary pieces 27, 28 by rings 25, 26, respectively. The rings 25, 26 are secured to the outer ends of the plates 18, 19 to preferably support the plates in the plane of the respective ring and in a radially inward direction. The rings 25, 26 are secured in the mold so that the aluminum alloy flows around the plates and positions the plates where the top piston ring groove is to be cut. The piston is cast and the aluminum forms a piston as shown in FIG. 2 with the plates 18, 19 of the piece embedded in the aluminum and the rings 25, 26 projecting from the cast piston. The piston is then machined forming the top 11, side 12 and the grooves 15, 16, 17. The top groove 15 is cut with the center of the groove between the plates 18, 19.

In stamping the piece, the plate 18 is formed with bevelled side edges 28, 29 with notches 30, 31, respectively. Thus the plate 18 has a trapezoidal cross section. The plate 19 is similarly formed with bevelled edges 32, 33 and notches 34, 35 therein. When the pieces are positioned in the mold, the plates 18, 19 have their narrow faces 36, 37 in contact so that the combined cross section has a form as shown in FIG. 5.

In forming the piston ring groove 15, the plates 18, 19 are machined to form the radial surfaces 20, 21 and axial surfaces 23, 24. Thus the radial surface 20 forms a continuous piston ring groove surface with the adjacent surfaces 38 of the aluminum piston. The aluminum flows along the bevelled surfaces 28, 29 to provide triangular shaped aluminum portions 39, 39a between the piston ring groove surface and the bevelled surfaces 28, 29. Similarly the surface 21 of the plate 19 and adjacent aluminum surface 40 form a lower piston ring groove surface with triangular shaped aluminum portions 41, 41a. The notches 30, 31 in plate 18, and 34, 35 in plate 19 are embedded in the aluminum and the aluminum flows into the notches to radially anchor the plates 18, 19.

In operation the piston ring (not shown) in the groove 15 alternately hammers against the upper and lower piston ring groove surfaces to compress the triangular pieces 39, 39a, 41, 41a against the bevelled surfaces 28, 29 and 32, 33 to axially retain the plates. The notches 30, 31 and 34, 35 radially anchor the plates in the piston so that during the continuous operation of the piston at high temperatures and heavy loads, the plates will remain in position.

In FIGS. 8 and 9 the invention is adapted to forged aluminum alloy piston. In FIG. 8 the piston 42 is forged with an annular stepped edge, and a cast ring 43 is fitted on the piston and secured by an annular weld 44. The piston is then machined in a similar manner to the piston in FIG. 2.

In FIG. 9 a forged piston 45 is formed with a groove 46. The pieces are then cast in the groove by the aluminum 47. The piston is then machined to form the piston ring grooves.

In FIG. 10 another embodiment of the invention is shown with plates 50, 60 connected by inner rings 52, 62 stamped from sheet iron. The plates 50 are in the same plane and preferably uniformly arranged circumferentially around the ring 52. The plates 50 are punched with parallel sides 53, 54 and a tapered opening 55. The side of the opening 55 is conical in shape with the smaller end in one surface and the larger end in the opposite surface. The piece is molded in the piston in a similar manner as the previous embodiments. The two pieces are cast in the piston so that the plates 50 are above the plates 60. The plates 60 have tapered openings 65 having the wide end of the surface contiguous to the wide end surface of plates 50 and the narrow end in the opposite surface. The pieces are positioned with the surfaces of the wide ends of the openings facing each other so that the aluminum flows into the openings 55 and 65 to form wedged-shaped aluminum alloy stubs to anchor the plates 50 and 60 both as to axial and radial movement. As indicated in FIGS. 10 and 12, the cast piston is machined to form the side surface 62 and the top piston ring groove 63. The piston ring groove 63 extends radially inward to form a surface 64, indicated as a dotted line in FIG. 10. The openings 55 and 65 are embedded in the piston to form the aluminum alloy stubs 56, 66, extending from the main portion of the aluminum piston. Circular aluminum surfaces 57, 67 are formed in the surfaces 58, 68 of the plates 50 and 60, respectively. The surfaces 57 and 58 provide a continuous smooth upper sealing surface with the adjacent aluminum alloy surfaces of the piston and the surfaces 67 and 68 provide a similar lower sealing surface with the adjacent aluminum alloy surfaces of the piston. The piston ring fitting in the groove 63 alternately pounds against the surfaces 65, 66 to maintain the aluminum stubs 58, 68 in tight contact with the connecting surfaces of the openings 55 and 65. It is preferable that the openings 55 and 65 are coextensive so that the circular surfaces 57 and 67 are on opposite sides.

In FIGS. 13 and 14 plate 75 has a rectangular opening 76 instead of circular openings and a prong 81. The opening 76 is formed by punching or stamping the prong 81 from the plate and bending it at an angle to the plate. The opening has sides 77, 78 extending radially from the prong and side 79 opposite to the prong. The prong 81 is bent to form a substantial opening or passage 76 between the side 79 and the prong 81 to permit the unobstructed flow of aluminum into the opening 76 on the casting of the piston. The side 78 is at an angle to the surfaces of the plate to form a tapered opening through the plate 75 in cooperation with the surface 83 of the prong 81. The opening 76 converges towards the prong 81 with the wide end on the opposite side from the prong.

In the cast and machined piston, the plates 75 may be connected in pairs by web 84 on the inner edge of the plates 75. The pairs of plates are connected for the purposes of positioning in the mold by exterior webs 85 which are removed in the subsequent machining operation. As described in connection with the previous embodiments, the pieces are positioned in the mold in pairs so that each insert is formed by two separate plates. As shown in FIGS. 14 and 15, plate 86 is coextensive with the plate 75 and has an opening 87 with a prong 88 formed therefrom in a manner similar to the prong 81. The prongs 81 and 88 extend in an opposite direction to one another when embedded in the piston 94. The openings 76 and 87 are contiguous and preferably coextensive to form aluminum alloy stubs 89, 89a. The piston ring groove 90 is cut into the plates 75 and 86 to form an annular surface 91 and radial surfaces 92, 93. The piston ring fitting in the groove 90 pounds against the aluminum plugs in a manner similar to the previous embodiments. The prongs 81 and 88 are embedded in the piston to anchor the plates 75 and 86 against radial or circumferential movement.

It is thus seen from the foregoing description that the wear inserts or plates are firmly held in place and that with the continued use of the piston over long periods of operation, the proper shape of the piston ring groove is maintained. Thus, the upper and lower surfaces of the piston ring groove remain smooth and even to maintain the proper seal in cooperation with the piston ring.

This case is a continuation-in-part of my application Serial No. 436,593 filed June 14, 1954 and issued as patent No. 2,776,176, which is a continuation-in-part of my original application Serial No. 225,533 filed May 10, 1951 and issued as Patent No. 2,685,729, and is also a continuation-in-part of my application Serial No. 301,291 filed July 28, 1952 and issued as Patent No. 2,760,834.

I claim:

1. A piston structure comprising a piston head, a piston ring groove in said head having surfaces, an insert having a circumferentially extending ring embedded in said head and having members radially extending from said ring, each of said members having a surface contiguous with a ring groove surface and an embedded surface at an angle to a respective ring groove surface and facing said ring groove surface to form a wedge-shaped means between said ring groove surface and said radial member for axially retaining said insert in position in said piston head.

2. A unitary ring groove insert comprising a plurality of flat metal pieces arranged in a radially extending plane, connecting means alternately connecting the inner edges of adjacent pieces and outer edges of adjacent pieces for circumferentially spacing said pieces in the radial plane, each of said pieces having a surface at an angle to said piece for forming a wedge-shaped portion for axially locking said pieces when cast in a piston head.

3. A piston structure comprising a piston head, a piston ring groove in said head having generally radial surfaces, metal pieces circumferentially spaced and radially extending in said head, each having an embedding surface at an angle to the ring groove surface and facing the piston ring groove surface to form a wedge-shaped portion between said surface and said piston ring groove for axially retaining said piece in said piston head and connecting means between a pair of adjacent pieces for radially locking said pieces in said piston head.

4. A piston structure comprising a piston head made of metal, a piston ring groove in said head having upper and lower surfaces, separate upper and lower metal members embedded in said piston head and harder than the piston head, each of said members having a surface forming a portion of the respective ring groove surface and an inner portion extending radially within said surface, said inner portions of the upper and lower members being in contact and each inner portion having an axial thickness greater than one-half of the axial width of the piston groove.

5. A piston structure as set forth in claim 4 in which each of said members comprises a radially extending insert having generally radially extending edges at an angle to a respective ring groove surface to form wedged-shaped portions in said piston head and with a respective ring groove surface and said inner contacting portions forming an axially continuous segment of the inner wall of the piston ring groove.

6. A piston structure as set forth in claim 4 in which each of said inner portions is a circumferentially extending ring, said rings being in contact with one another and forming an inner axial piston ring groove surface and each of said rings having a plurality of radially extending circumferentially spaced segments, each segment having a surface corresponding to said surface forming a portion of a respective ring groove surface so that said upper and lower piston ring groove surfaces have circumferentially alternate surfaces of piston head metal and surfaces of metal of said member.

7. A piston structure as set forth in claim 5 in which said segments have a sloped surface facing the piston ring groove to form a wedged-shaped portion in said piston head between said sloped surface and said groove to axially lock said members in said piston head.

8. A piston structure comprising a piston head, a piston ring groove in said head having upper and lower surfaces, separate upper and lower members embedded in said piston head and harder than the piston head, said upper and lower members each having radially extending circumferentially spaced segments forming a surface portion of a respective ring groove surface and an interconnecting piece connecting inner radial ends of said segments to radially lock said members in said piston head, said interconnecting pieces engaging one another radially inside of said piston ring groove and each having an axial thickness greater than one-half the width of said piston ring groove.

9. A piston structure comprising an aluminum piston head, a piston ring groove in said head and having upper and lower pieces forming upper and lower piston ring groove wear surfaces, each piece having an inner circumferential extending portion radially inside the piston ring groove and having a thickness greater than one half of the width of the piston ring groove and in contact with one another to form an axial piston ring groove wall surface, a radially extending portion formed as a single piece with said inner portion and extending radially to form a wear surface to the outer surface of said piston head and having a notch with a radial dimension less than the depth of the piston ring groove to form a continuous piston ring groove wear surface adjacent said axial wall, and an aluminum plug formed as a single piece with said piston head fitting in said space in engagement with said radial extending portion to lock said piece in said piston head.

10. A piston structure comprising an aluminum piston head, a piston ring groove in said head and having upper and lower steel pieces forming upper and lower piston ring groove wear surfaces, each piece having an inner circumferentially extending portion radially inside the piston ring groove and in contact with one another to form an axial piston ring groove wall surface, flat spaced radially extending portions formed as a single piece with said inner portion and extending radially to form a notch extending from the outer edge of the groove to the inner circumferentially extending portion and with a radial dimension less than the depth of the piston ring groove, an aluminum plug formed as a single piece with said piston head fitting in said space in engagement with said radial extending portion to lock said piece in said piston head, said upper and lower pieces formed in said upper and lower piston ring groove surfaces coextensive with said pieces, and an inner continuous wear surface and an outer wear surface extending radially to the edge of the groove to alternately form circumferential steel wear surfaces and aluminum wear surfaces.

11. A piston structure comprising a piston head containing aluminum metal, a piston ring groove in said head having upper and lower wear surfaces, steel pieces in one of said surfaces and having an inner ring portion and radially extending portions formed as a single piece with said ring portion and rings circumferentially arranged in spaced relation with radially extending portions of the piston head metal between said radial portions, said radial portions having flat surfaces facing said groove to form with said piston head a continuous smooth wear surface of alternate flat steel surfaces and flat piston head metal surfaces, each radial portion having a conical shaped aperture extending through a respective insert, said apertures having larger openings facing one another in a respective upper and lower surface, said piston head having wedge-shaped studs fitting in said apertures to retain said inserts in said piston head.

12. A piston structure comprising a piston head of aluminum and a piston ring groove in said head having upper and lower piston ring groove surfaces, a pair of hard metal inserts on opposite sides of said groove having flat surfaces facing one another and circumferentially arranged in a respective ring groove surface to form a continuous sealing surface of alternate surfaces of hard steel and aluminum, each of said inserts having an aperture therethrough with an angular member extending to embed said members in said piston head for radially locking a respective insert, said angular member forming a wall in said aperture at an angle to said piston ring groove surface and a wall opposite to said angular member at an angle facing said piston ring groove to form said aperture to converge axially away from said piston ring groove surface, said piston head having wedge-shaped studs fitting in a respective aperture to engage said angular walls for axially locking said inserts in said piston head, said studs having their respective wider portion forming a continuous ring groove surface with said steel insert surface and said aluminum piston head surface to form a continuous sealing surface.

13. A piston structure comprising a piston head of aluminum material, a piston ring groove in said head having piston ring groove surfaces, a flat metallic member embedded in said piston head and harder than said aluminum material, said member extending in a plane parallel to said surfaces and radially from the outer edge of a piston ring groove surface to within said piston ring groove to form an inner portion, said member having a notch radially extending from the outer edge to a distance less than the depth of the groove, and an aluminum projection extending into said notch to radially lock said member in place, said inner portion having an axial thickness greater than one-half the axial width of the piston groove.

14. A piston structure comprising a piston head of aluminum material, a piston ring groove in said head having upper and lower radially extending piston ring groove surfaces, upper and lower flat metallic members embedded in said piston head and harder than said aluminum material, said members extending parallel to the plane of said surfaces and radially from the respective outer edges of said piston ring grooves to within said piston ring grooves to form upper and lower inner portions engaging one another radially to form an inner axial wall of said piston ring groove, each of said inner portions having an axial thickness greater than one-half of the axial width of said piston ring groove, said upper and lower members each having a notch radially extending from the outer edges of a respective piston ring groove surface to a distance less than the depth of said piston ring groove and an aluminum projection extending inward into said notch to radially lock said members in place.

15. A piston structure as set forth in claim 13 wherein said member has at least one surface embedded in said piston head and facing said piston ring groove, said piston head having a portion positioned between said surface and said respective piston ring groove surfaces to axially lock said member in said piston head.

16. A piston head structure as set forth in claim 14 wherein each of said members has at least one surface embedded in said piston head and facing said piston ring groove, and said piston head having portions positioned between a respective embedded surface and said piston ring groove to axially lock said members in said piston head.

17. A piston structure comprising a piston head of aluminum material, a piston ring groove in said head having radially extending piston ring groove surfaces, a flat metallic member embedded in said piston head and harder than the aluminum material, said member having a wear-resistant surface extending in the plane of a piston ring groove surface and having radially extending edges to form surfaces of aluminum material on each side thereof, said member extending radially from the outer edge of a piston ring groove surface to within a piston ring groove to form an inner portion having an axial thickness greater than one-half the width of the piston ring groove and an orifice in said member having a wall facing said piston ring groove, and said piston head having a projection extending into said orifice and between said surface and said piston ring groove to axially and radially lock said member in place.

18. A piston structure comprising a piston head, a piston ring groove in said head having upper and lower surfaces, a member embedded in said piston head extending radially from the outer edge of said piston ring groove to radially within said piston to form an inner portion having an axial thickness greater than one-half of the width of the piston ring groove, a surface on said member forming a portion of one ring groove surface to form radial wear-resistant surfaces between two radial aluminum surfaces and a side on said member at an angle to said piston surface and facing the piston ring groove surface to form a wedge-shaped piston head portion between said piston ring groove surface and said member to axially lock said member in said head.

19. A piston structure comprising a piston head, a piston ring groove in said head having upper and lower surfaces, a pair of steel members embedded in said piston head each extending radially inward from respective outer edges of said upper and lower surfaces to radially within said piston to form inner portions each having an axial thickness greater than one-half of the width of the groove, said members having surfaces in said upper and lower piston ring groove surfaces respectively to form radial steel wear-resistant surfaces between two radial aluminum surfaces in respective piston ring groove surfaces and sides on said members at an angle to said piston surfaces and facing the piston ring groove surface to form a wedge-shaped piston head portion between said piston ring groove surface and said member to axially lock said member in said head.

20. A piston ring structure as set forth in claim 13 wherein said inner portion is in the parallel plane of said member.

21. A piston ring structure as set forth in claim 14 wherein said respective inner portions are in the parallel planes of said respective members.

22. A piston structure comprising a piston head of highly heat conductive metal material, a piston ring groove in said head, metal wear-resistant reinforcing means harder than the metal material of said piston head and embedded therein, said wear-resistant means having a plurality of wear-resistant surfaces extending radially and circumferentially spaced with said piston head forming intervening surfaces of metal piston head material to form a continuous smooth sealing wear surface of alternate flat wear-resistant surfaces and flat piston head metal surfaces, said wear-resistant reinforcing means extending radially inward from said groove with an axial thickness greater than one-half the width of said groove and extending axially approximately to and terminating at the axial mid point of said groove to form an axial wear-resistant wall surface extending axially to approximately the mid point of the groove.

23. A piston structure comprising a piston head, a piston ring groove in said head having piston ring groove surfaces, a member embedded in said piston head and harder than the piston head, said member having radially extending circumferentially spaced segments forming a surface portion of a piston ring groove surface and an interconnecting piece connecting inner radial ends of said segments to radially lock said member in said piston head, said interconnecting member having an axial thickness greater than one-half the width of said piston ring groove.

24. A piston structure comprising a piston head, a piston ring groove in said head having upper and lower surfaces, a member embedded in said piston head extending radially from the outer edge of said piston ring groove to radially within said piston to form an inner portion having an axial thickness greater than one-half of the width of the piston ring groove, a surface on said member forming a portion of one ring groove surface to form radial wear-resistant surface between two radial surfaces of piston head material and a surface on said member at an angle to said piston surface and facing the piston ring groove surface to form a wedge-shaped piston head portion between said piston ring groove surface and said member to axially lock said member in said head.

25. A piston structure comprising a piston head of highly heat conductive metal material, a piston ring groove in said head, metal wear-resistant reinforcing means harder than the metal material of said piston head and embedded therein, said wear-resistant means having a plurality of wear-resistant surfaces extending radially and circumferentially spaced, said wear-resistant reinforcing means extending radially inward from said groove with an axial thickness greater than one-half the width of said groove and extending axially approximately to and terminating at the axial mid point of said groove to form an axial wear-resistant wall surface extending axially to approximately the mid point of the groove.

26. A piston structure comprising a piston head, a piston ring groove having upper and lower surfaces, two piston groove inserts each formed as a single piece of material harder than piston head material and having radially within said piston ring groove inner portions in contact and with an axial thickness greater than one-half the width of the piston ring groove, each of said inserts having a continuous extending ring member and radially extending portions, said radially extending portions being in the plane of said ring member and forming reinforcing surfaces in a respective piston ring groove surface, each radially extending portion having side surfaces at an angle to said piston ring groove surface and facing said piston ring groove surface, wedge shaped piston head portions between said side surfaces and said piston ring groove surface to axially lock said respective inserts in said head and said inserts engaging radially within said piston ring groove to form a firm embedment in said piston head.

27. A piston structure comprising a piston head of aluminum material, a piston ring groove in said head having piston ring groove surfaces, a metallic member embedded in said piston head and harder than said aluminum material, said member extending in a plane parallel to said surfaces to reinforce only one side of said surface and extending radially from the outer edge of a piston ring groove surface to within said piston ring groove to form an inner portion, said member having a notch radially extending from the outer edge to a distance less than the depth of the groove, and an aluminum projection extending into said notch to radially lock said member in place, said inner portion having an axial width greater than one-half the axial width of the piston groove.

References Cited in the file of this patent

UNITED STATES PATENTS

| | | |
|---|---|---|
| 2,550,879 | Stevens | May 1, 1951 |
| 2,685,729 | Daub | Aug. 10, 1954 |
| 2,689,773 | Brenneke | Sept. 21, 1954 |
| 2,755,151 | Daub | July 17, 1956 |
| 2,771,328 | Wainwright et al. | Nov. 20, 1956 |
| 2,809,079 | Daub | Oct. 8, 1957 |

FOREIGN PATENTS

| | | |
|---|---|---|
| 455,539 | France | May 27, 1913 |
| 548,400 | Great Britain | Oct. 8, 1942 |